United States Patent
Kim et al.

(10) Patent No.: US 10,043,595 B2
(45) Date of Patent: Aug. 7, 2018

(54) URANIUM DIOXIDE NUCLEAR FUEL PELLET HAVING CERAMIC MICROCELLS

(71) Applicants: Korea Atomic Energy Research Institute, Daejeon (KR); Korea Hydro & Nuclear Power Co., Ltd, Gyeongju-si, Gyeongsangbuk-do (KR)

(72) Inventors: Keon-Sik Kim, Daejeon (KR); Yang-Hyun Koo, Daejeon (KR); Jong-Hun Kim, Daejeon (KR); JangSoo Oh, Cheonan-si (KR); Young Woo Rhee, Daejeon (KR); Dong-Joo Kim, Daejeon (KR); Jae-Ho Yang, Sejong-si (KR)

(73) Assignees: Korea Hydro & Nuclear Power Co., Ltd, Gyeongju-si (KR); Korea Atomic Energy Research Institute, Daejeon (KR)

( * ) Notice: Subject to any disclaimer, the term of this patent is extended or adjusted under 35 U.S.C. 154(b) by 1247 days.

(21) Appl. No.: 14/060,432

(22) Filed: Oct. 22, 2013

(65) Prior Publication Data
US 2014/0185730 A1    Jul. 3, 2014

(30) Foreign Application Priority Data

Dec. 31, 2012   (KR) .................. 10-2012-0158685

(51) Int. Cl.
*G21C 3/58*     (2006.01)
*G21C 3/62*     (2006.01)
(Continued)

(52) U.S. Cl.
CPC ........... *G21C 3/044* (2013.01); *G21C 3/16* (2013.01); *G21C 3/17* (2013.01); *G21C 3/58* (2013.01);
(Continued)

(58) Field of Classification Search
USPC .......................................... 376/414
See application file for complete search history.

(56) References Cited

U.S. PATENT DOCUMENTS 2,990,351 A * 6/1961 Sanz ............... G21C 3/06
                                                         376/414
3,409,504 A * 11/1968 Meny .............. G21C 3/20
                                                         376/414

(Continued)

FOREIGN PATENT DOCUMENTS

JP            6-186369 A    7/1994
KR    10-1993-0008873 A    5/1993
(Continued)

OTHER PUBLICATIONS

Office Action dated Mar. 18, 2014 of corresponding Korean Patent Application No. 10-2012-0158685—7 pages.

*Primary Examiner* — Sharon M Davis
(74) *Attorney, Agent, or Firm* — Knobbe Martens Olson & Bear LLP

(57) ABSTRACT

A uranium dioxide nuclear fuel pellet has about 50 to about 400 μM (with respect to a 3-dimentional size) microcells formed of a ceramic material having a chemical attraction with fission products generated in the nuclear fuel pellet to absorb and trap the fission products, such that the extraction of the fission product may be retrained in a normal operation condition and that the performance of the nuclear fuel may be enhanced by mitigating PCI. In addition, highly radio-active fission products including Cs and I having a large generation amount or a long half-life enough to affect the environments can be trapped in the pellet in an accident condition, without being released outside.

6 Claims, 5 Drawing Sheets

(51) Int. Cl.
  *G21C 3/17*   (2006.01)
  *G21C 3/04*   (2006.01)
  *G21C 3/16*   (2006.01)
  *G21C 21/02*  (2006.01)

(52) U.S. Cl.
  CPC .............. *G21C 3/62* (2013.01); *G21C 21/02* (2013.01); *G21C 2003/045* (2013.01); *Y02E 30/38* (2013.01)

(56) References Cited

U.S. PATENT DOCUMENTS

| | | | | |
|---|---|---|---|---|
| 3,784,384 A * | 1/1974 | Webb | | C03C 4/00 376/414 |
| 3,826,754 A * | 7/1974 | Grossman | | G21C 3/17 252/638 |
| 3,867,489 A * | 2/1975 | Rubin | | G21C 3/623 252/638 |
| 3,992,258 A * | 11/1976 | Tobin | | G21C 3/626 264/0.5 |
| 4,869,866 A * | 9/1989 | Lay | | G21C 3/623 252/636 |
| 5,180,527 A * | 1/1993 | Hirai | | G21C 3/62 252/638 |
| 5,257,298 A * | 10/1993 | Yuda | | G21C 3/623 252/638 |
| 5,272,740 A * | 12/1993 | Marsaud | | G21C 3/17 376/184 |
| 5,995,585 A | 12/1999 | Dehaudt et al. | | |
| 5,999,585 A * | 12/1999 | Dehaudt | | G21C 3/623 252/640 |
| 6,221,286 B1 | 8/2001 | Dehaudt et al. | | |
| 7,521,007 B1 * | 4/2009 | Jarvinen | | G21C 3/04 252/636 |
| 2003/0113447 A1 * | 6/2003 | Sherwood | | C04B 35/51 427/221 |
| 2004/0103752 A1 | 6/2004 | Song et al. | | |
| 2010/0091933 A1 * | 4/2010 | Song | | G21C 3/58 376/414 |
| 2012/0207264 A1 * | 8/2012 | Van Den Berghe | | G21C 3/60 376/414 |
| 2013/0240805 A1 * | 9/2013 | Kang | | G21C 3/04 252/638 |
| 2014/0185731 A1 | 7/2014 | Kim et al. | | |

FOREIGN PATENT DOCUMENTS

| | | |
|---|---|---|
| KR | 09-501491 A | 2/1997 |
| KR | 10-2010-0041982 A | 4/2010 |
| KR | 10-2010-0052977 A | 5/2010 |
| KR | 10-2011-0020044 A | 3/2011 |

\* cited by examiner

UO2 Nuclear Fuel Pellet

Microcell in UO2 Nuclear Fuel Pellet

Ceramic Cell Wall   Fission Product (FP)   Trapping on Cell Wall

Microcell

URANIUM DIOXIDE NUCLEAR FUEL PELLET HAVING CERAMIC MICROCELLS

FIELD

The present disclosure relates to a uranium dioxide ($UO_2$) pellet for light water reactor nuclear fuel and a method of making the same.

BACKGROUND

Nuclear power plant uses heat generated by nuclear fission of uranium, and an $UO_2$ sintered pellet is generally used as nuclear fuel for nuclear power plant. The $UO_2$ sintered pellet may be produced by sintering a green pellet. The $UO_2$ sintered pellet produced by such an existing method has a density of about 96% TD (theoretical density) and a grain size of about 8-14 μm.

Recently, high burnup nuclear fuels have been developed, which are burnt for a long time in order to increase economic efficiency of nuclear fuel and reduce an amount of spent fuel. As the burnup of nuclear fuel increases, a generation amount of fission products such as Xe, Kr, Cs and I increases. The increased fission product will increase stress in a cladding tube, which may deteriorate the safety of nuclear fuel. Accordingly, in order to overcome those limitations, fission product must be released from the pellet as little as possible.

In addition, after Hukusima nuclear power plant accident, there are increasing demands for development of $UO_2$ nuclear fuel pellets with an enhanced accident resistance to trap highly radioactive fission product as much as possible to prevent the release of fission products having a high level of radioactivity outside the environments.

The fission product is the material generated during the fission caused after fissile materials (a typical example of such fissile materials is U-235) absorb thermal neutron. When fission occurs in $UO_2$ nuclear fuel, one uranium atom is split into two fission products. Fission products can be classified into four groups in terms of their volatility and chemical activity: volatile fission product including fission gases, semi-volatile fission product, fission product that are low volatile, and non-volatile fission product. Among the four groups, volatile fission product (I and Cs) and fission gases (Xe and Kr), are most important in terms of fuel degradation and radiological consequence, because they have very strong chemical activity and are also easily released outside the fuel pellet and environment.

SUMMARY

Accordingly, the present disclosure provides a uranium dioxide nuclear fuel pellet having ceramic microcells arranged therein and a fabricating method thereof.

An aspect of the invention provides a uranium dioxide nuclear fuel pellet, which may comprise: microcells defined by micro-partitions comprising a ceramic material; and uranium dioxide contained in the microcells, such that at least part of fission products would be trapped in the microcells upon fissioning.

In the foregoing uranium dioxide nuclear fuel pellet, metallic particles may be dispersed in the uranium dioxide and configured to react with oxygen more easily than the uranium dioxide does. The ceramic material may have a chemical attraction with the fission products. The ceramic material may comprise at least one chemical compound selected from a group consisting of Si-compound, Ti-compound, Al-compound, Mg-compound, Mn-compound, Na-compound, Ca-compound and Ba-compound. An average size of the microcell may be about 50 μm to about 400 μm. Each of at least some of the microcells contains a single grain of the uranium oxide. The metallic particles may comprise Cr or Mo. An average size of the metallic particles may be about 0.3 μm to about 10 μm.

Still in the foregoing uranium dioxide nuclear fuel pellet, one of the micro-partitions may be located between two immediately neighboring grains of the uranium oxide and contacts the two immediately neighboring grains of the uranium oxide. The micro-partition located between the two immediately neighboring grains of the uranium oxide may completely separate the two immediately neighboring grains of the uranium oxide not to contact each other. The micro-partition located between the two immediately neighboring grains of the uranium oxide may have a hole allowing the two immediately neighboring grains to contact each other. The micro-partitions of the ceramic material may have chemical attraction with fission products and configured to inhibit diffusion of the fission products at boundaries of the uranium oxide. The uranium dioxide may be filled in the microcells.

Another aspect of the invention provides a method of making a uranium dioxide nuclear fuel pellet, which may comprise: providing a mixture of uranium dioxide powder and additive powder comprising a ceramic material; forming a pellet by compressing the powder mixture; and sintering the pellet at a temperature at which at least part of the additive powder is changed into liquid which permeates between grains of the uranium oxide thereby forming micro-partitions comprising the ceramic material defining microcells in which the uranium dioxide is contained.

In the foregoing method, the additive powder may be one or more selected from a group consisting of Si-compound, Ti-compound, Al-compound, Mg-compound, Mn-compound, Na-compound, Ca-compound and Ba-compound. In the mixture, a ratio of the additive powder with respect to the uranium dioxide powder may be about 0.1% to about 8.0% by weight. The compound selected as the additive powder comprises at least one selected from the group consisting of oxide, nitride, sulfide, fluoride, chloride, stearate, carbonate, nitrate and phosphate. The liquidus temperature of the additive may be about 1200° C. to about 1800° C. And the sintering temperature may be about 1600° C. to about 1800° C. The pellet may be sintered under reducing gas atmosphere of a reducing gas which comprises a hydrogen-containing gas. The hydrogen-containing gas may comprise a mixture of a hydrogen gas and at least one selected from a group consisting of carbon dioxide, water vapor and inert gas. The ceramic material may have chemical attraction with the fission products.

In an aspect of the invention, about 50 μm to about 400 μm (with respect to a 3-dimentional size) microcells formed of a ceramic material having a chemical attraction with fission products generated in the nuclear fuel pellet and the fission products are absorbed and trapped, such that the extraction of the fission product may be retrained in a normal operation condition and that the performance of the nuclear fuel may be enhanced by mitigating PCI. In addition, ceramic microcell $UO_2$ pellet will enhance the retention ability of highly radioactive and corrosive fission products such as Cs and I, where all $UO_2$ grains are enveloped by thin ceramic cell walls which act as chemical trap in an accident condition, without being released into the environment.

In another aspect, metallic particles reactive with excess oxygen generated during the burnup may be further provided in the ceramic microcells. Together with the trapping of the fission products, the excess oxygen may be effectively controlled to slow down the diffusion rate of the fission products. Accordingly, the performance of the nuclear fuel can be enhanced more.

In still another aspect, the ceramic microcells arranged in the nuclear fuel pellet may be formed of a ceramic material having a chemical attraction with the fission products or metallic particles reactive with the excess oxygen generated during the burnup are additionally arranged in the ceramic microcells. Together with the trapping of the fission products, the diffusion rate may be slowed down to make the fission products remain in the nuclear fuel pellet effectively. Accordingly, release of the fission products may be controlled according to a fabricating method of the $UO_2$ nuclear fuel pellet.

Additional advantages and features of the disclosure will be set forth in part in the description which follows and in part will become apparent to those having ordinary skill in the art upon examination of the following or may be learned from practice of the invention. The aspects and other advantages of the invention may be realized and attained by the structure particularly pointed out in the written description and claims hereof as well as the appended drawings.

To achieve these aspects and other advantages and in accordance with the purpose of the embodiments, as embodied and broadly described herein, a uranium dioxide nuclear fuel pellet includes ceramic microcells arranged in the nuclear fuel pellet to trap fission products. In another aspect of the present invention, a uranium dioxide nuclear fuel pellet includes ceramic microcells arranged in the nuclear fuel pellet to trap fission products; and metallic particles arranged in the ceramic microcells to trap excess oxygen.

In a further aspect of the present invention, a fabricating method of a uranium dioxide nuclear fuel pellet comprising ceramic microcells arranged therein, the fabricating method includes steps of fabricating a powder mixture by mixing a uranium dioxide powder with an additive powder comprising a chemical attraction with fission products; fabricating a pellet by compressing the powder mixture; and sintering the pellet at about 1600° C. to about 1800° C. under a reducing gas atmosphere. The additive may be one or more selected from a group of Si-compound, Ti-compound, Al-compound, Mg-compound, Mn-compound, Na-compound, Ca-compound and Ba-compound.

The embodiments have the following advantageous effects. Microcells having about 50 μm to about 400 μm (with respect to a 3-dimentional size) are formed of a ceramic material having a chemical attraction with fission products generated in the nuclear fuel pellet and the fission products are absorbed and trapped, such that the extraction of the fission product may be retrained in a normal operation condition and that the performance of the nuclear fuel may be enhanced by mitigating PCI. In addition, highly radioactive fission products including Cs and I can be trapped in the pellet in an accident condition.

It is to be understood that both the foregoing general description and the following detailed description of the embodiments or arrangements are exemplary and explanatory and are intended to provide further explanation of the embodiments as claimed.

DETAILED DESCRIPTION OF EMBODIMENTS

Various embodiments of a fission product trapping pellet with ceramic microcells arranged therein and a fabricating method thereof will be described as follows, referring to the accompanying drawings. Reference will now be made in detail to the specific embodiments of the present invention, examples of which are illustrated in the accompanying drawings. Wherever possible, the same reference numbers will be used throughout the drawings to refer to the same or like parts.

In uranium oxide pellets without any barriers or walls between grains, the fission product is produced within grains and diffused to grain boundary, and exists as bubbles. When the fission product reaches a predetermined amount, a bubble tunnel is formed along the grain boundary, and the fission product is released from the pellet through the bubble tunnel.

As the grain size of the pellet increases, the diffusion distance of fission product to the grain boundary becomes longer. Therefore, the fission product remains within the pellet for a longer time, thus reducing a released amount of the fission product. Thus, high burnup nuclear fuel pellet may have an increased grain size.

$UO_2$ nuclear fuel pellet is inserted in a zirconium alloy unclear fuel cladding which is deformed inwardly during the burn-up and the nuclear fuel pellet is swollen outwardly by neutron irradiation, such that the nuclear fuel pellet and the cladding may contact with each other to generate stress. Especially, it is more likely to operate a nuclear fuel for an ultrahigh burnup level in an extreme situation such as a high power or a transition operation. When the output power is increased for a relatively short time, the temperature of the nuclear fuel pellet is increased and a predetermined pressure is applied to the fuel cladding by heat expansion. When high stress is applied to the fuel cladding at a high burnup level for a relatively short time, there might be damage on the fuel cladding. Accordingly, to reduce the pressure applied to the fuel cladding generated by the thermal expansion of the nuclear fuel pellet, a new pellet having an increased amount of initial deformation and an increased rate of creep deformation is developed and Pellet-Clade interaction (hereinafter, PCI) characteristics are enhanced.

When the grain size of the pellet is increased, the movement distance of the fission product is increased, and may slow down the extraction of the fission products. Further, an additive may be provided to heighten the creep deformation rate of the fuel pellet such that the stress applied to a fuel cladding can be reduced effectively.

Figure 1:
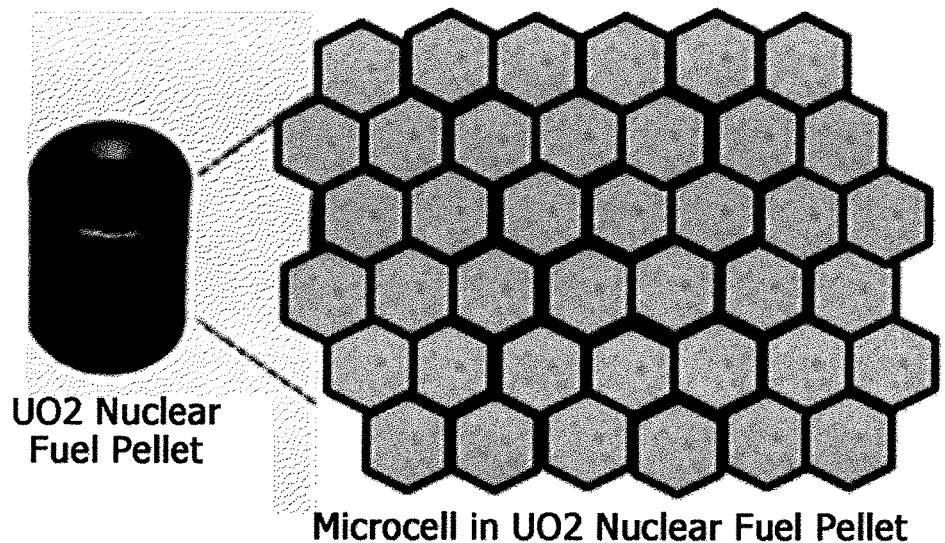
FIG. 1 is a conceptual diagram illustrating microcells arranged in an uranium dioxide fission nuclear pellet according to the present invention.

FIG. 1 is a conceptual diagram illustrating microcells arranged in a uranium dioxide fission nuclear pellet according to the present invention.

There may be provided a method of trapping a fission product in a nuclear pellet ($UO_2$ pellet) having microcells arranged therein.

Figure 2:
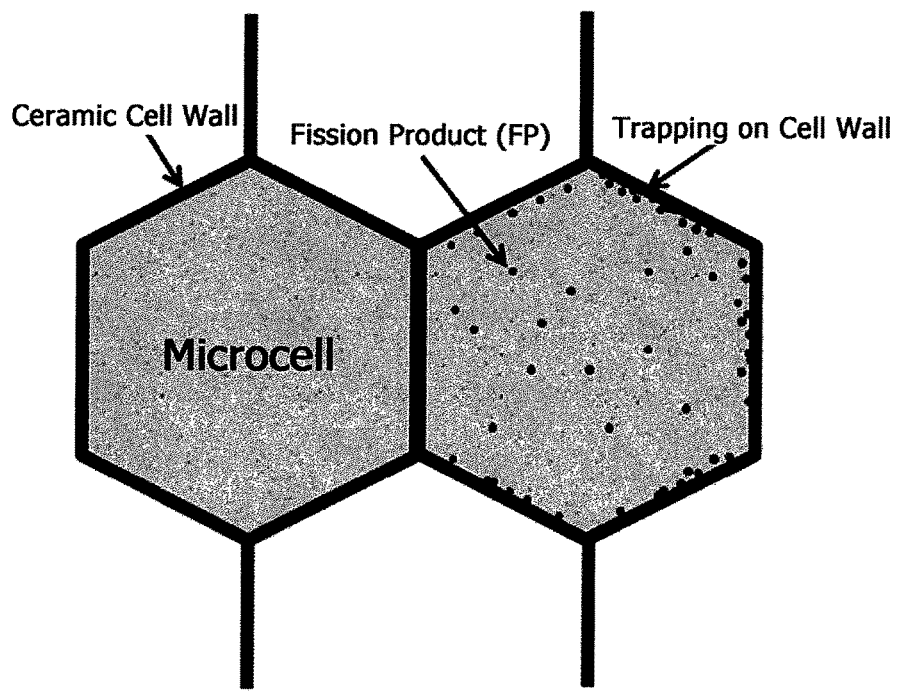
FIG. 2 is a conceptual drawing of trapping a fission product by arranging the ceramic microcells in the uranium dioxide nuclear fuel pellet according to the present invention.

FIG. 2 is a conceptual drawing of trapping a fission product by arranging the ceramic microcells in the uranium dioxide nuclear fuel pellet according to the present invention. Ceramic microcells having a chemical attraction with fission products are arranged in the uranium dioxide nuclear fuel pellet, such that extraction of fission products in a normal operational condition may be restrained and that PCI is mitigated, so as to enhance the performance of the nuclear fuel and to enable the nuclear fuel pellet to effectively trap radioactive fission products including Cs and I having a long half-life and a large amount enough to affect the environments out of fission products in an accident condition to prevent release of the radioactive fission products outside.

The ceramic material used in forming the microcells arranged in the uranium nuclear fuel pellet may be a material having a chemical attraction with the fission products. Especially, such the ceramic material may be one or more chemical elements selected from a group configured of a Si-compound, a Ti-compound, an Al-compound, an Mg-compound, a Mn-compound, a Na-compound, a Ca-compound and a Ba-compound.

The ceramic material has a chemical attraction with Cs and I having a large generation amount and a long half-life out of the fission products enough to affect the environments if they are extracted outside in an accident. Accordingly, the fission products including Cs and I generated during the irradiation reaches a wall of the cell, the material composing the cell wall absorbs and traps the fission products, to restrain the release of the fission products.

In embodiments, the size of the microcell is within about 50 to about 400 μm. In embodiments, a suitable number of microcells can be formed with a small amount of an additive powder and when the average size of the microcell is in the range of about 50 to about 400 μm.

The ceramic material content of the microcell is in a range of about 0.1% to about 8.0% with respect to the weight of the uranium dioxide. The content of the ceramic material is in the range of about 0.1% to about 8.0% that can form the appropriate microcells in the nuclear fuel pellet and maintain the appropriate amount of the uranium per unit volume of the nuclear fuel pellet.

The ceramic material of the microcell is partially or entirely changed into liquid at about 1200 to about 1800° C. In embodiments, the ceramic material is changed into liquid below about 1800° C. that is the upper limit of the sintering temperature, to form the microcells during the sintering effectively and to set the nuclear fuel pellet not changed to liquid below about 1200° C. that is the upper limit temperature of the normal operation condition.

As mentioned above, the ceramic material starting to be changed into liquid ceramic in the range of about 1200 to about 1800° C. is used and then the cell wall is softened, such that the initial deformation amount and the creep deformation rate may be increased enough to enhance PCI characteristics of the nuclear fuel pellet.

The ceramic material compound may be one or more ones selected from a group configured of metal, oxide, sulfide, fluoride, chloride, stearate, carbonate, nitrate and phosphate.

In addition, the ceramic microcells are formed per grain unit.

Figure 3:
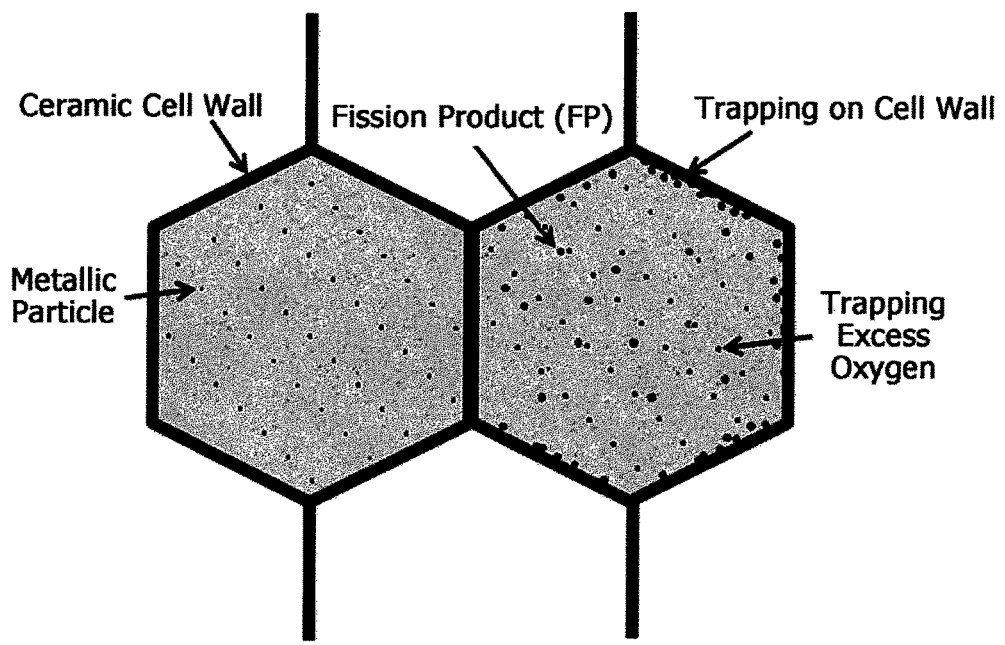
FIG. 3 is a conceptual drawing of trapping excess oxygen and the fission product by additionally arranging metallic particles in the ceramic microcells arranged in the uranium dioxide nuclear fuel pellet according to the present invention.

FIG. 3 is a conceptual drawing of trapping excess oxygen and the fission product by additionally arranging metallic particles in the ceramic microcells arranged in the uranium dioxide nuclear fuel pellet according to the present invention.

Referring to FIG. 3, the ceramic microcells are arranged and metallic particles capable of forming an oxide stably by reacting with the excess oxygen, prior to $UO_2$, are additionally arranged in the uranium dioxide nuclear fuel pellet, only to absorb and trap the fission products. Together with that, the movement speed of the fission products is slowed down and the nuclear fuel pellet can have an enhanced nuclear fuel performance and stability.

A metallic particle arranged in the microcell of the uranium diode nuclear fuel pellet reacts with the excess oxygen generated at a burnup level of about 70,000 MWD/MTU, prior to $UO_2$, and the metallic particle absorbs and isolates the excess oxygen not to react with $UO_2$. It is preferable that the metallic particle is Cr or Mo.

An average size of the metallic particle may be about 0.3 to about 10 μm. The size of the metallic particle may be in the range of about 0.3 to about 10 μm that is the range capable of arranging an appropriate number of the particles per unit weight.

Next, a fabricating method of the uranium dioxide nuclear fuel pellet having the ceramic microcells arranged therein according to the present invention will be described as follows.

The fabricating method includes steps of fabricating powder mixture by mixing the uranium dioxide powder with the additive powder that consists of one or more elements selected from the group of the Si-compound, Ti-compound, Al-compound, Mg-compound, Mn-compound, Na-compound, Ca-compound and Ba-compound; fabricating a green pellet by compressing the powder mixture; and sintering the green pellet at about 1600 to about 1800° C. under the reducing gas atmosphere.

According to one embodiment of the present invention, the compounds provided in the additive powder added in the powder mixture fabricating step may be at least one selected from the group of metal, oxide, nitride, sulfide, fluoride, chloride, stearate, carbonate, nitrate and phosphate.

According to one embodiment of the present invention, the content of the additive is about 0.1 to about 8.0% of the overall weight in the powder mixture fabricating step. The limited content of the ceramic material is the range of about 0.1 to about 8.0% that can form the appropriate microcells in the nuclear fuel pellet and maintain the appropriate amount of the uranium per unit volume of the nuclear fuel pellet.

According to one embodiment of the present invention, the selected additive may be partially or entirely changed into liquid below about 1800° C. that is the upper limit temperature of the typical sintering temperature and it may not start to be changed into liquid below about 1200° C. that is the upper limit of the normal operation condition. The liquid formed in the sintering may make the grain grow rapidly and the liquid is disposed along a boundary of the growing grain. Accordingly, the grain unit ceramic microcell having an appropriate size can be formed effectively and the nuclear fuel pellet may be maintained during the irradiation, with no liquid grain boundary.

The size of the microcell is limited within about 50 to about 400 μm. In embodiments, a suitable number of microcells can be formed with a small amount of an additive powder and when the average size of the microcell is in the range of about 50 to about 400 μm.

According to one embodiment of the present invention, the reducing gas atmosphere in the sintering step may be hydrogen-containing gas atmosphere. Especially, the hydrogen-containing gas may be a hydrogen-containing gas mixture formed of a hydrogen gas mixed with at least one selected from a group of carbon dioxide, vapor and inert gas or a hydrogen.

Next, embodiments of the present invention will be described in detail as follows. Here, the embodiments which will be described as follows are examples of the present invention and the scope of the present invention is not limited by the embodiments.

First Embodiment 1.0% of $SiO_2$, $TiO_2$ and $Al_2O_3$ powder with respect to $UO_2$ powder is added to uranium dioxide ($UO_2$) powder and they are mixed with each other by a mixer for 2 hours, to prepare the powder mixture. At this time, the weight ratio of the $SiO_2$ powder, $TiO_2$ powder and $Al_2O_3$ powder added at this time may be 35.86%, 37.08% and 27.06%.

A green pellet is fabricated by compressing the powder mixture with 3 ton/cm$^2$.

The green pellet is heated at a heating rate of 300° C. per hour under hydrogen gas atmosphere, to make the temperature of the pellet reach 1720° C. The heated pellet is maintained for 4 hours and cooled to be a normal temperature at a rate of 300° C. per hour under the same atmosphere, such that the uranium dioxide unclear fuel pellet may be fabricated.

The density of the fabricated nuclear fuel pellet is measured based on Archimedes' principle and a cross section of the nuclear fuel pellet having the density measured is polished like a mirror. After that, the size and structure of the microcell is observed.

Figure 4:
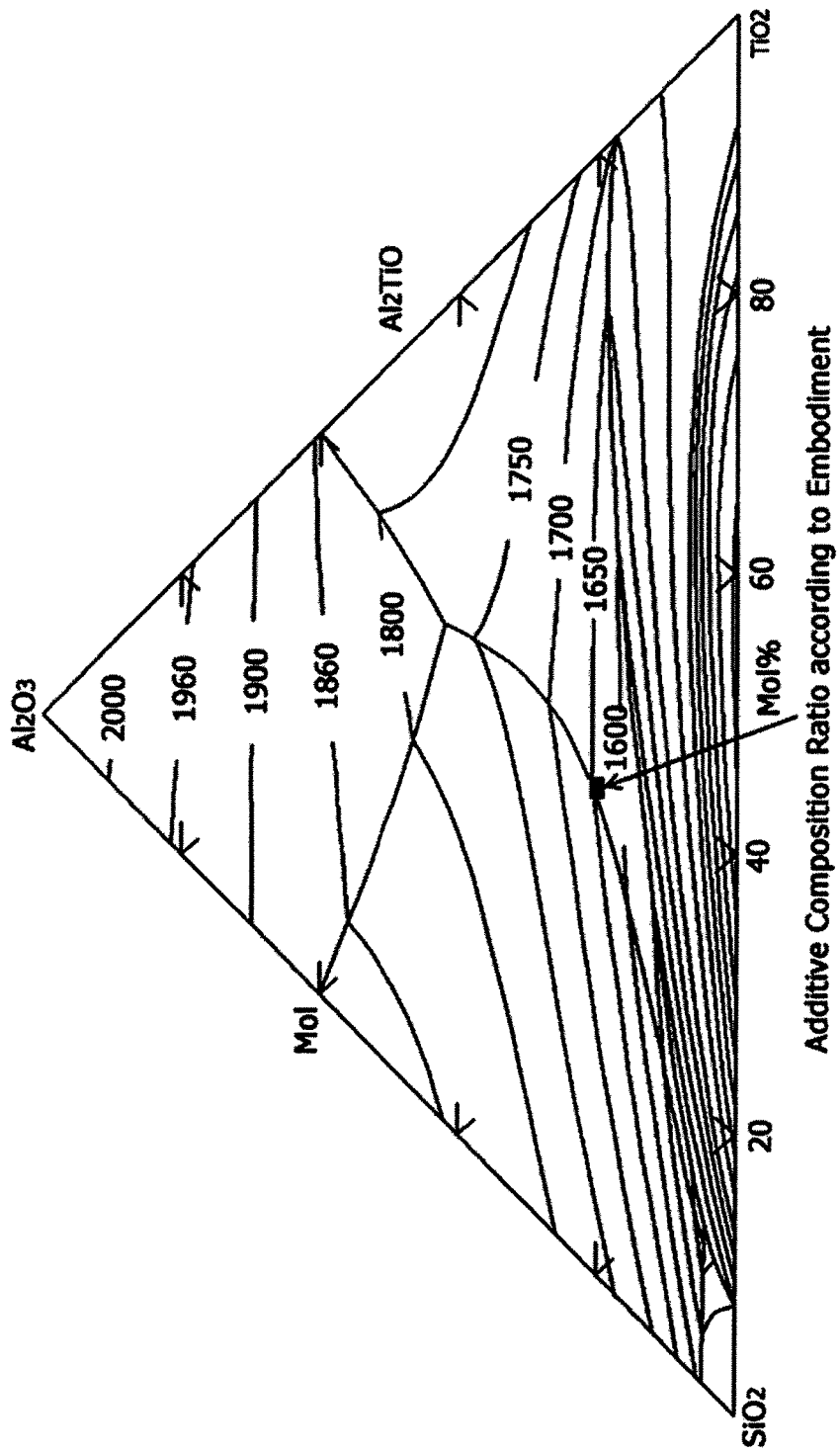
FIG. 4 is a drawing illustrating a phase diagram of $SiO_2$—$TiO_2$—$Al_2O_3$ according to a first embodiment of the present invention.

FIG. 4 is a drawing illustrating a phase diagram of $SiO_2$—$TiO_2$—$Al_2O_3$ according to a first embodiment of the present invention and shows a composition ratio selected according to the embodiment. The temperature of a liquidus line possessed by the selected additive is about 1650° C.

It is measured that the density of the nuclear fuel pellet fabricated in the process mentioned above is 96.9% of TD and that an average size of the microcell is 87 μm.

Figure 5:
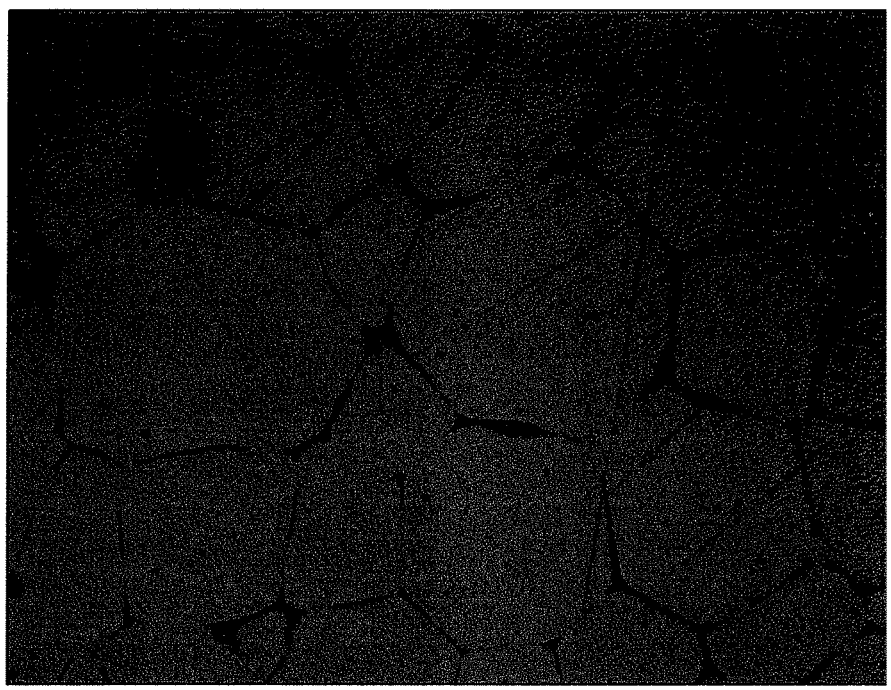
FIG. 5 is an optical micrograph image of a ceramic microcell structure of an uranium dioxide nuclear fuel pellet fabricated according to the first embodiment of the present invention.

FIG. 5 is an optical micrograph image of a ceramic microcell structure of a uranium dioxide nuclear fuel pellet fabricated according to the first embodiment of the present invention. As shown in FIG. 5, the microcells are formed along the grain boundary.

Second Embodiment 1.0% of $SiO_2$, $Al_2O_3$ and MnO powder with respect to $UO_2$ powder is added to uranium dioxide ($UO_2$) powder and they are mixed with each other by a mixer for 2 hours, to prepare the powder mixture. At this time, the weight ratio of the $SiO_2$ powder, $Al_2O_3$ powder and MnO powder added at this time may be 40.5%, 45.5% and 14.0%.

The powder mixture is compressed and sintered in the same process mentioned in the first embodiment and the $UO_2$ pellet is fabricated.

It is measured that the density of the nuclear fuel pellet fabricated in the process mentioned above is 97.3% of TD and that an average size of the microcell is 96 μm.

Figure 6:
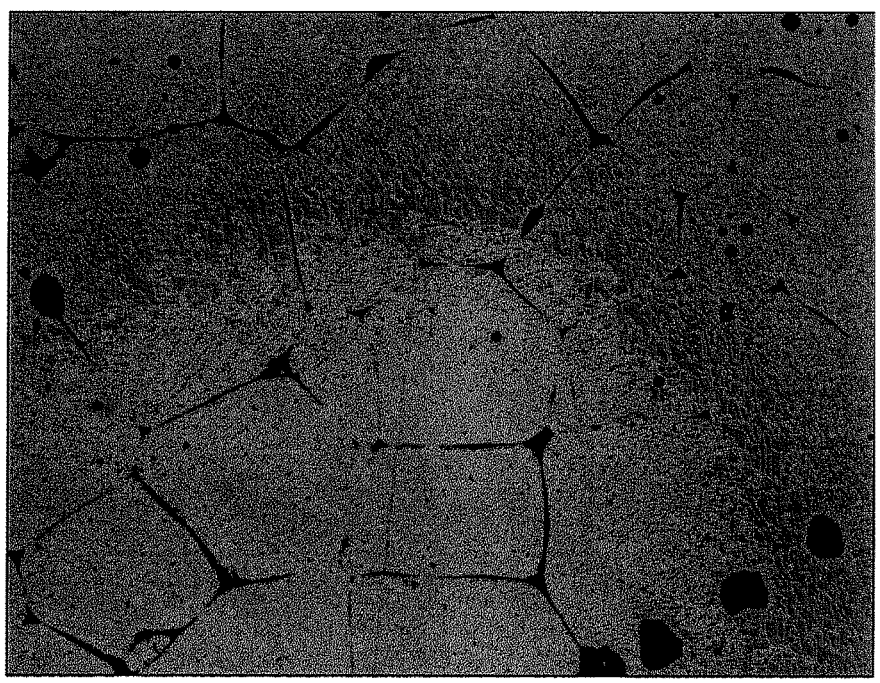
FIG. 6 is an optical micrograph image of a ceramic microcell structure of an uranium dioxide nuclear fuel pellet fabricated according to a second embodiment of the present invention.

FIG. 6 is an optical micrograph image of a ceramic microcell structure of a uranium dioxide nuclear fuel pellet fabricated according to a second embodiment of the present invention. As shown in FIG. 6, the microcells are formed along the grain boundary.

Third Embodiment 0.8% of $TiO_2$ and MgO powder with respect to $UO_2$ powder is added to uranium dioxide ($UO_2$) powder and they are mixed with each other by a mixer for 2 hours, to prepare the powder mixture. At this time, the weight ratio of the $TiO_2$ powder and MgO powder added at this time may be 70% and 30%.

The powder mixture is compressed and sintered in the same process mentioned in the first embodiment and the $UO_2$ pellet is fabricated.

It is measured that the density of the nuclear fuel pellet fabricated in the process mentioned above is 97.2% of TD and that an average size of the microcell is 102 μm.

Figure 7:
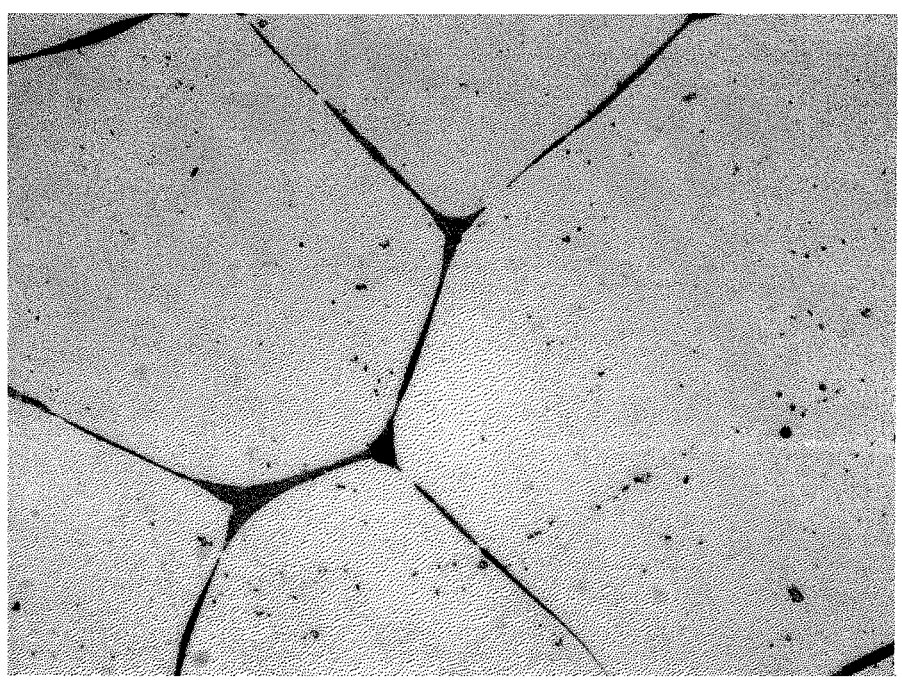
FIG. 7 is an optical micrograph image of a ceramic microcell structure of a uranium dioxide nuclear fuel pellet fabricated to a third embodiment of the present invention.

FIG. 7 is an optical micrograph image of a ceramic microcell structure of a uranium dioxide nuclear fuel pellet fabricated to a third embodiment of the present invention. As shown in FIG. 6, the microcells are formed along the grain boundary.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. In addition to variations and modifications in the component parts and/or arrangements, alternative uses will also be apparent to those skilled in the art.

What is claimed is:

1. A uranium dioxide nuclear fuel pellet comprising:
   uranium dioxide grains; and micro-partitions partitioning and contacting the uranium dioxide grains,
   wherein the micro-partitions consist essentially of a ceramic material that melts in a temperature range of 1200-1800° C.,
   wherein the ceramic material is a mixture comprising two or more selected from the group consisting of Si-compounds, Ti-compounds, Al-compounds, Mg-compounds, and Mn-compounds, and
   wherein the mixture further comprises the Ti-compounds in an amount of at least 37.08 wt % or the Mn-compounds in an amount of 14.0 wt %.

2. The uranium dioxide nuclear fuel pellet of claim 1, further comprising:
   metallic particles dispersed in the uranium dioxide grains and configured to react with oxygen more easily than uranium dioxide does.

3. The uranium dioxide nuclear fuel pellet according to claim 2, wherein the metallic particles comprise Cr or Mo.

4. The uranium dioxide nuclear fuel pellet according to claim 2, wherein an average size of the metallic particles is about 0.3 μm to about 10 μm.

5. The uranium dioxide nuclear fuel pellet according to claim 1, wherein the micro-partitions define a plurality of microcells, wherein each of at least some of the microcells contains a single grain of uranium oxide.

6. The uranium dioxide nuclear fuel pellet according to claim 1, wherein one of the micro-partitions is located between two immediately neighboring grains of the uranium dioxide grains and contacts the two immediately neighboring grains.

* * * * *